(12) United States Patent
Fujinuma et al.

(10) Patent No.: US 7,711,961 B2
(45) Date of Patent: May 4, 2010

(54) ELECTRONIC APPARATUS AND AUTHENTICATING METHOD

(75) Inventors: Keiichi Fujinuma, Saitama (JP); Toshiharu Yanagida, Toyko (JP); Yoshio Okoshi, Kanagawa (JP); Ichiro Kosugi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1082 days.

(21) Appl. No.: 10/913,548

(22) Filed: Aug. 9, 2004

(65) Prior Publication Data

US 2005/0071647 A1 Mar. 31, 2005

(30) Foreign Application Priority Data

Aug. 27, 2003 (JP) ............................. 2003-302655

(51) Int. Cl.
*H04K 1/00* (2006.01)
(52) U.S. Cl. ..................... 713/186; 600/490; 707/5; 707/10; 84/635; 715/809
(58) Field of Classification Search ................. 713/186
See application file for complete search history.

(56) References Cited

U.S. PATENT DOCUMENTS

| | | | | |
|---|---|---|---|---|
| 4,505,583 A | * | 3/1985 | Konomi | 356/73 |
| 4,794,089 A | * | 12/1988 | Mroczkowski et al. | 436/501 |
| 4,797,569 A | * | 1/1989 | Boyacigiller | 327/54 |
| 5,010,451 A | * | 4/1991 | Ueyama et al. | 361/504 |
| 5,768,158 A | * | 6/1998 | Adler et al. | 716/11 |
| 5,978,566 A | * | 11/1999 | Plank et al. | 709/206 |
| 6,138,130 A | * | 10/2000 | Adler et al. | 715/210 |
| 6,208,341 B1 | * | 3/2001 | van Ee et al. | 715/716 |
| 6,375,735 B1 | * | 4/2002 | Stephens et al. | 106/600 |
| 6,805,670 B2 | * | 10/2004 | Shirasaki | 600/490 |
| 6,898,299 B1 | * | 5/2005 | Brooks | 382/115 |
| 2003/0181816 A1 | * | 9/2003 | Shirasaki | 600/490 |
| 2005/0071647 A1 | * | 3/2005 | Fujinuma et al. | 713/186 |

FOREIGN PATENT DOCUMENTS

| | | |
|---|---|---|
| JP | 64-037962 | 2/1989 |
| JP | 11-282757 | 10/1999 |
| JP | 2000-200315 | 7/2000 |
| JP | 2001-117661 | 4/2001 |
| JP | 2001-195145 | 7/2001 |
| JP | 2003-058269 | 2/2003 |
| JP | 2003-093368 | 4/2003 |
| JP | 2003-141088 | 5/2003 |

\* cited by examiner

*Primary Examiner*—Kambiz Zand
*Assistant Examiner*—Yonas Bayou
(74) *Attorney, Agent, or Firm*—Oblon, Spivak, McClelland, Maier & Neustadt, L.L.P.

(57) ABSTRACT

Biogenic information of the user is obtained through a camera unit and an authentication sensor and compared with biogenic information of a person with use authority has previously been stored, thereby discriminating whether or not the user has the use authority. When the user is authenticated, that is, if it is determined that the user is the person with the use authority, an electronic apparatus permits the user to use each function and operate. The authentication of the user is executed when the user wears the electronic apparatus. After he removes it, the authentication result is not held, thereby disabling a person without the use authority to use the electronic apparatus. The biogenic information (physical feature) of the user is detected and the personal authentication can be executed without requiring the user to execute the annoying inputting operation for the personal authentication.

23 Claims, 7 Drawing Sheets

ELECTRONIC APPARATUS AND AUTHENTICATING METHOD

BACKGROUND OF THE INVENTION

1. Field of the Invention

The invention relates to an electronic apparatus for authenticating the user of the electronic apparatus and an authenticating method of the user.

2. Description of the Related Arts

In recent years, in association with the realization of a light weight and the miniaturization of electronic parts, electronic apparatuses which are used by being attached to bodies of the users are extensively being developed. They are also called wearable (attachable to the body) electronic apparatuses. For example, there are electronic apparatuses of various forms such as watch, necklace, ring, bracelet, and headset. A wearable electronic apparatus of a watch type has been disclosed in JP-A-2002-125039.

FIG. 1 shows an external appearance of the watch type electronic apparatus disclosed in JP-A-2002-125039. The electronic apparatus of FIG. 1 is constructed by an apparatus main body 101 and a wristband 102 retained to both end portions of the main body 101. A display unit 103 to display various information is provided in an almost center portion of an upper surface of the apparatus main body 101. Buttons 104a, 104b, and 104c to operate the watch type electronic apparatus are provided in a lower portion of the upper surface of the apparatus main body 101. Further, a plurality of small buttons 106 to input information are provided in an extending portion 105 extended from the lower portion of the apparatus main body 101. An antenna (not shown) is provided in the apparatus main body 101, so that it is possible to communicate with a parent terminal (cellular phone terminal).

Although such an electronic apparatus is small and convenient to be carried around, there is a risk that it is abused by a stranger when the user leaves the electronic apparatus, or the like. In the electronic apparatus as mentioned above, therefore, it is often controlled to require the user to input a user ID, a personal identification number (PIN), or the like when a predetermined operation is executed. In an apparatus such as an electronic apparatus in FIG. 1 having a function for communicating with the outside, also in the case of starting the communication, it is necessary to input the user ID and the PIN for the purpose of assuring security of the transmitting side and the receiving side. In the electronic apparatus of FIG. 1, the user is required to input the user ID and the PIN by pressing the buttons 106 several times, thereby guaranteeing by the personal authentication that he is a rightful user.

However, since a size of each button 106 is very small as shown in FIG. 1, there is a high possibility that the user misinputs the information. If he misinputs the information, a message or the like showing that the inputted user ID and the PIN are wrong is displayed and he has to input the correct information again. Therefore, he needs to carefully input the correct user ID and the PIN in order to avoid such a wasteful reinputting operation.

Since such personal authentication as mentioned above is often required every predetermined operation or communication of the electronic apparatus, the user has to execute the inputting operation each time with the small buttons. Those operations are extremely annoying and stressful to the user and, at the same time, he feels a serious psychological stress. The more frequently he uses the electronic apparatus, the more stressed he feels.

OBJECTS AND SUMMARY OF THE INVENTION

It is, therefore, an object of the invention to provide an electronic apparatus and an authenticating method, in which biogenic information (physical features) of the user is detected and personal authentication is executed without requiring him to execute the annoying inputting operation for the personal authentication.

Another object of the invention is to provide an electronic apparatus and an authenticating method, in which personal authentication regarding the user is executed when he puts the electronic apparatus on and a result of the authentication is held until he removes it.

According to the invention, there is provided an electronic apparatus which can be attached to the user, comprising: biogenic information obtaining means for obtaining biogenic information regarding the user; authenticating means for comparing the biogenic information of the user obtained by the biogenic information obtaining means with biogenic information of a person who has use authority of the electronic apparatus and discriminating whether or not the user is a person with the use authority, thereby executing authentication of the user; and control means for controlling so as to permit the user to use the electronic apparatus when he is authenticated by the authenticating means.

According to the invention, there is provided an authenticating method comprising: a biogenic information obtaining step of obtaining biogenic information regarding the user who puts an electronic apparatus on; an authenticating step of comparing the biogenic information of the user obtained in the biogenic information obtaining step with biogenic information of a person with the use authority of the electronic apparatus and discriminating whether or not the user is a person with the use authority, thereby executing authentication of the user; and a control step of controlling so as to permit the user to use the electronic apparatus when he is authenticated by the authenticating step.

According to the invention, when the user uses the electronic apparatus, the authentication is executed by using the biogenic information of the user. Therefore, he does not need to actively input information, so that a chance that he feels annoyed or stressed is reduced. The personal authentication is executed after it is detected that the user has put the electronic apparatus on. The authentication result is held to be valid until he removes the electronic apparatus. Therefore, even if a person who does not have the rightful use authority obtains the electronic apparatus by some chance, he cannot use the electronic apparatus.

The above and other objects and features of the present invention will become apparent from the following detailed description and the appended claims with reference to the accompanying drawings.

DETAILED DESCRIPTION OF THE PREFERRED EMBODIMENT

An embodiment of the invention will now be described with reference to the drawings. It is a large feature of the invention that whether or not the user has put an electronic apparatus on is detected by an attachment sensor, when the attachment is confirmed, personal authentication for giving a use authority of the electronic apparatus is executed by an authenticating sensor for detecting biogenic information that is peculiar to the user. Thus, the user does not need to execute the inputting operation or the like for the personal authentication and hardly feels annoyingness and psychological stress.

There is a watch type as a typical example of such a wearable electronic apparatus. It is a tool for realizing such functions that when the user executes a predetermined input, a predetermined still image or motion image is displayed onto the display unit in accordance with the input, communication with an outside is executed, a sound is generated from a speaker, and the like.

Figure 1:
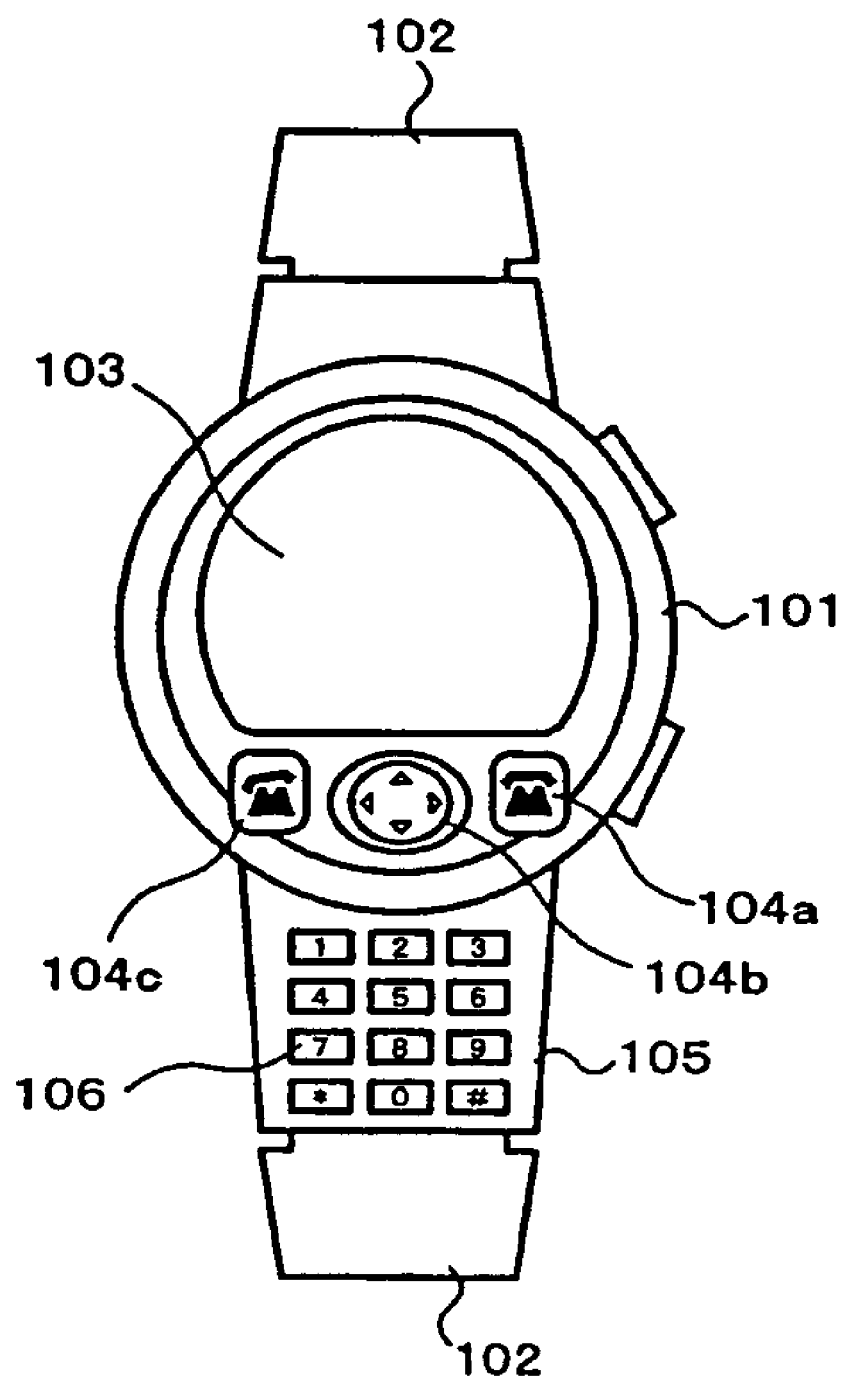
FIG. 1 is a schematic diagram showing an external view of a conventional electronic apparatus.
Figure 2:
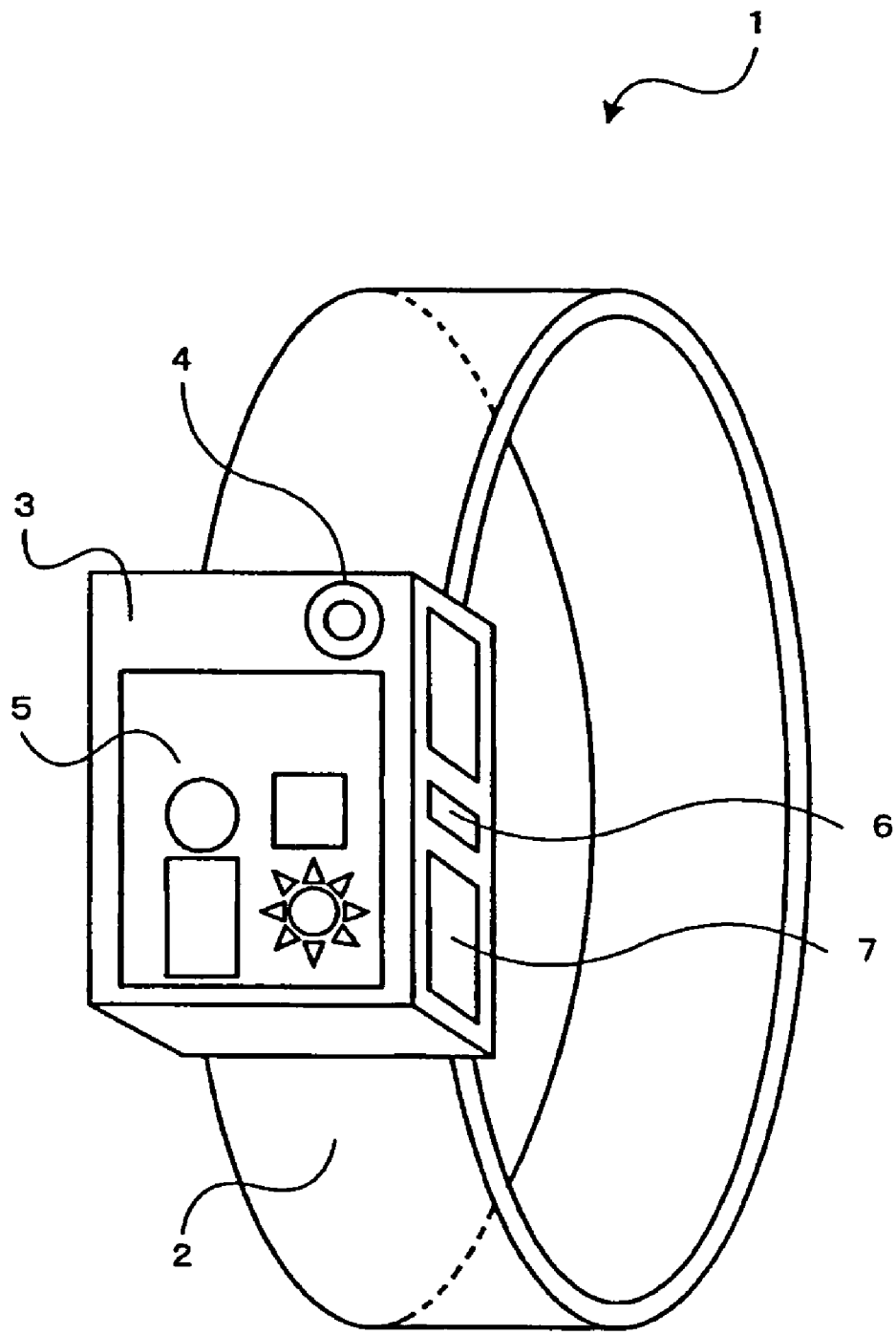
FIG. 2 is a schematic diagram showing an external view of an electronic apparatus according to an embodiment of the invention.

FIG. 2 shows an external appearance of an electronic apparatus 1 of a watch type according to an embodiment of the invention. The electronic apparatus 1 has a main body 3 and a wristband 2 retained to an upper edge portion and a lower edge portion of the main body 3. A display unit 5 such as a flat display, for example, an LCD (Liquid Crystal Display) or the like is arranged at an almost center of the main body 3. A camera unit 4 comprising an image pickup device such as CCD (Charge Coupled Device), CMOS (Complementary Metal Oxide Semiconductor), or the like and a lens is provided in an upper right portion of the main body 3.

An input unit for inputting to the electronic apparatus 1 is provided on a right side surface of the main body 3. The user selects a desired menu displayed on the display unit 5 by moving the finger on an electrostatic capacity sensor 7 or selects a desired item by tapping it. The electrostatic capacity sensor 7 detects that electrostatic capacities in a plurality of positions are changed due to the movement of a fingertip having conductivity, thereby detecting the motion of the finger of the user. A principle of such a sensor is similar to that of a pointing device (also referred to as a touch pad or a truck pad) which is often used in notebook-sized personal computers.

A fingerprint sensor 6 is further provided in the input unit of the electronic apparatus 1. A fingerprint of the user is read by the sensor 6. There are principles according to a semiconductor system and an optical system as typical examples of a principle by which the fingerprint sensor 6 reads the fingerprint. In the example shown in FIG. 2, biogenic information of the user is obtained from the camera unit 4 and the fingerprint sensor 6 and whether the user is a rightful user or not is discriminated on the basis of the obtained biogenic information. Details of the discriminating method will be described hereinafter.

The camera unit 4 and the fingerprint sensor 6 can be classified as authenticating sensors for obtaining the biogenic information which is used for personal authentication of the user. As mentioned above, the fingerprint of the user is obtained from the fingerprint sensor 6 and various video images regarding the biogenic information such as outline of the face, iris of a pupil, or the like are obtained from the camera unit 4. The camera unit 4 can have not only the function for obtaining the biogenic information but also the function as an image pickup device of a digital camera.

The biogenic information which is used for the personal authentication by the invention is not limited to the fingerprint obtained by the sensor 6 and the outline, iris, and the like which are obtained from the video images of the camera unit 4. There are many other biogenic information which can be used for the personal authentication of the user, that is, the biogenic information by which a specific person can be identified besides the above biogenic information. Any biogenic information can be used by providing sensors for obtaining them. For example, a pulse, veins, a fingertip pulse wave, a voiceprint, a walk-print, or the like is detected and can be used for the personal authentication. The walk-print is detected by a walk-print sensor. That is, it is detected by measuring a peel-off charging pattern which is caused between the foot and the floor when the user walks.

In the electronic apparatus 1 in FIG. 2, as mentioned above, the personal authentication based on the fingerprint obtained by the fingerprint sensor 6 and the personal authentication based on the video image of the iris or the like obtained by the camera unit 4 can be executed. However, if the personal authentication is executed by simultaneously using both of them, precision of the authentication can be further improved. The personal authentication can be also executed by using a plurality of authenticating methods of using other biogenic information.

In the case of making the personal authentication by using a plurality of biogenic information, it is possible to control in such a manner that if it is determined that the user has the use authority of the electronic apparatus 1 with respect to all of a plurality of biogenic information, the use authority of the electronic apparatus 1 is given to the user. It is also possible to construct the apparatus in such a manner that if it is determined that the user has the use authority of the electronic apparatus 1 with respect to a predetermined number (for example, a majority) or more of arbitrary biogenic information among the plurality of biogenic information, the use authority of the electronic apparatus 1 is given to the user. For example, in the case of making the authentication from five different kinds of biogenic information, if the use authority of the user is permitted with respect to any four of those five biogenic information, it is possible to determine that the user is a person who has the use authority.

The authenticating methods using the biogenic information can be classified into a "contact type" and a "contactless type" in accordance with the kind of sensor. Therefore, in the case of making the personal authentication by a combination of a plurality of authenticating methods, for example, it is also possible to select one of the authenticating methods of the contact type and one of the authenticating methods of the contactless type and combine them.

As mentioned above, in the electronic apparatus 1 as shown in FIG. 2, the key inputting operation for the personal authentication which has been necessary hitherto each time the electronic apparatus 1 is used or each time the user receives the services using the electronic apparatus 1 becomes unnecessary.

Further, the sensors can be arranged so as to input the biogenic information in the normal state where the user uses the electronic apparatus 1 (that is, the user does not aware of the state where he is inputting the data for authentication). For example, as shown in FIG. 2, the camera unit 4 can be attached in a position where the video image can be obtained in the state where the user is looking at the contents displayed on the display unit 5, that is, in the ordinary operation. If the fingerprint sensor 6 is constructed so that it is arranged on the surface or the like of the button, the fingerprint can be obtained in the ordinary operation of the user.

Figure 3:
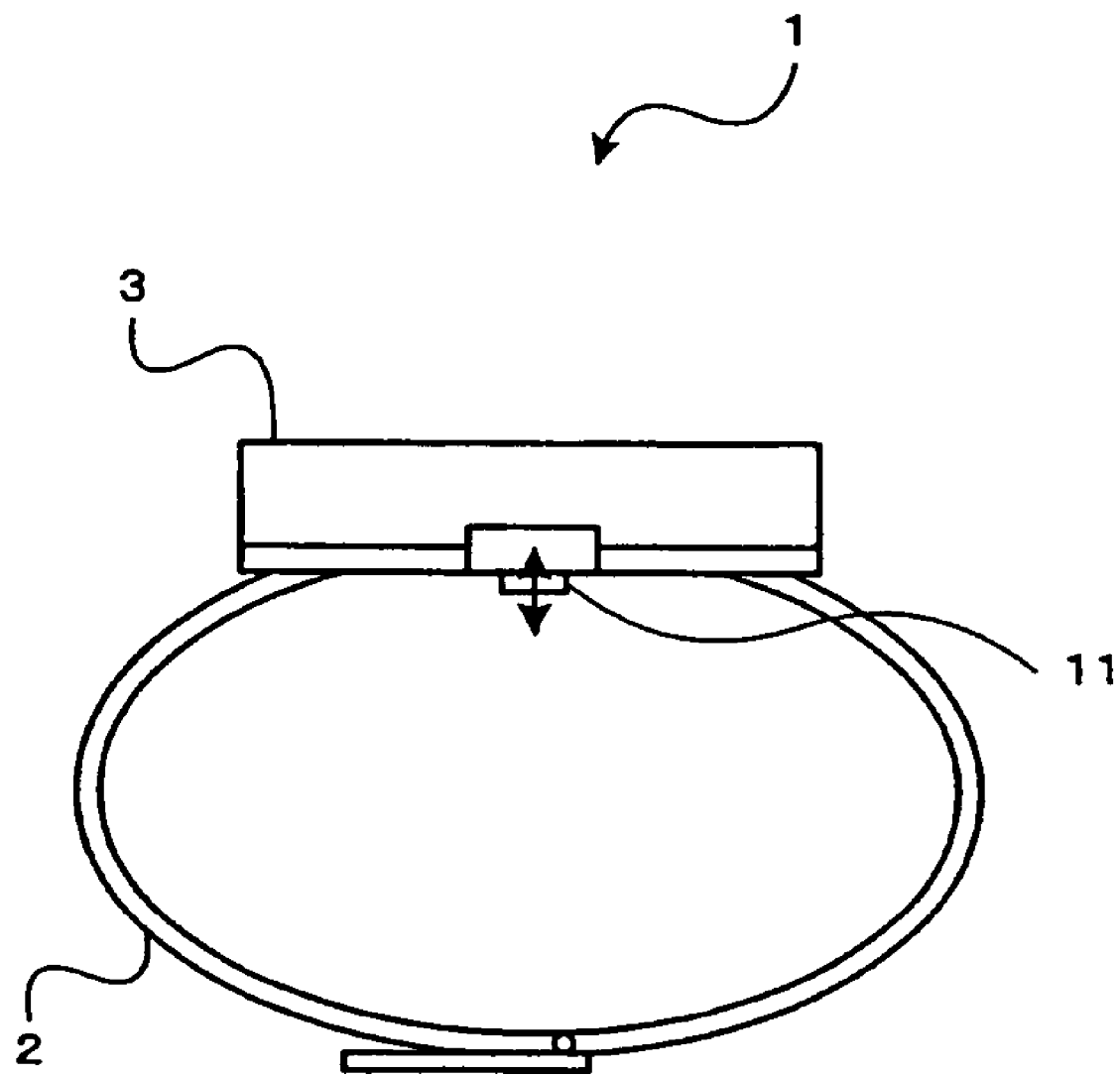
FIG. 3 is a schematic diagram showing a side view of the electronic apparatus according to the embodiment of the invention.

An attachment sensor 11 of the electronic apparatus 1 will now be described with reference to FIG. 3. FIG. 3 is a schematic diagram showing a side elevational view of the watch type electronic apparatus 1 shown in FIG. 2. In an example of FIG. 3, the attachment sensor 11 is a pressure sensor provided on the back side of the main body 3. When the user puts the electronic apparatus 1 on, that is, he wears it to his wrist with the wristband 2, the pressure sensor detects a upward pressure because the wrist of the user is come into contact with the main body 3.

The attachment sensor 11 is not limited only to the foregoing pressure sensor. The attachment of the electronic apparatus 1 can be also detected by using another sensor such as electrostatic sensor, photosensor, ultrasonic sensor, or temperature sensor. Since the watch type electronic apparatus 1 is shown in the example of FIG. 3, it is desirable to provide the attachment sensor 11 to the rear side of the main body 3. In another type of electronic apparatus, however, it is necessary to properly select the kind and a setting position of the attachment sensor 11.

It is preferable that the attachment sensor 11 detects the contact of the main body 3 of the electronic apparatus 1 with the user or a predetermined proximity state. It is a feature of the invention that when the user once puts the electronic apparatus on, the authentication of the user is handled as a valid authentication until he removes it. Therefore, it should be determined that the state where the user has actually put the electronic apparatus on corresponds to the "attachment". For example, it is undesirable that when both ends of the wristband are connected, such a state is determined to be the "attachment".

Figure 4:
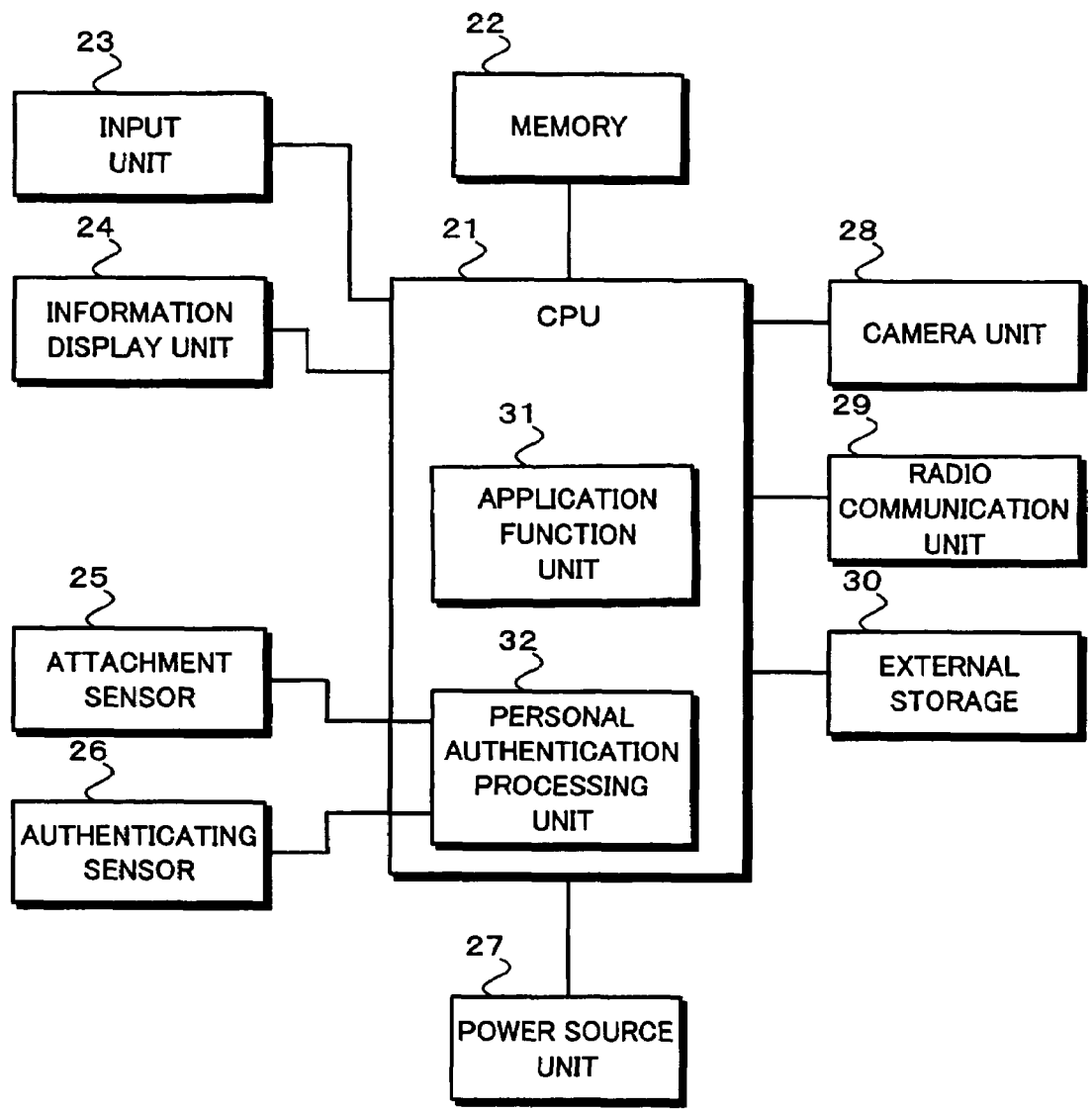
FIG. 4 is a block diagram showing a system construction of the electronic apparatus according to the embodiment of the invention.
Figure 5:
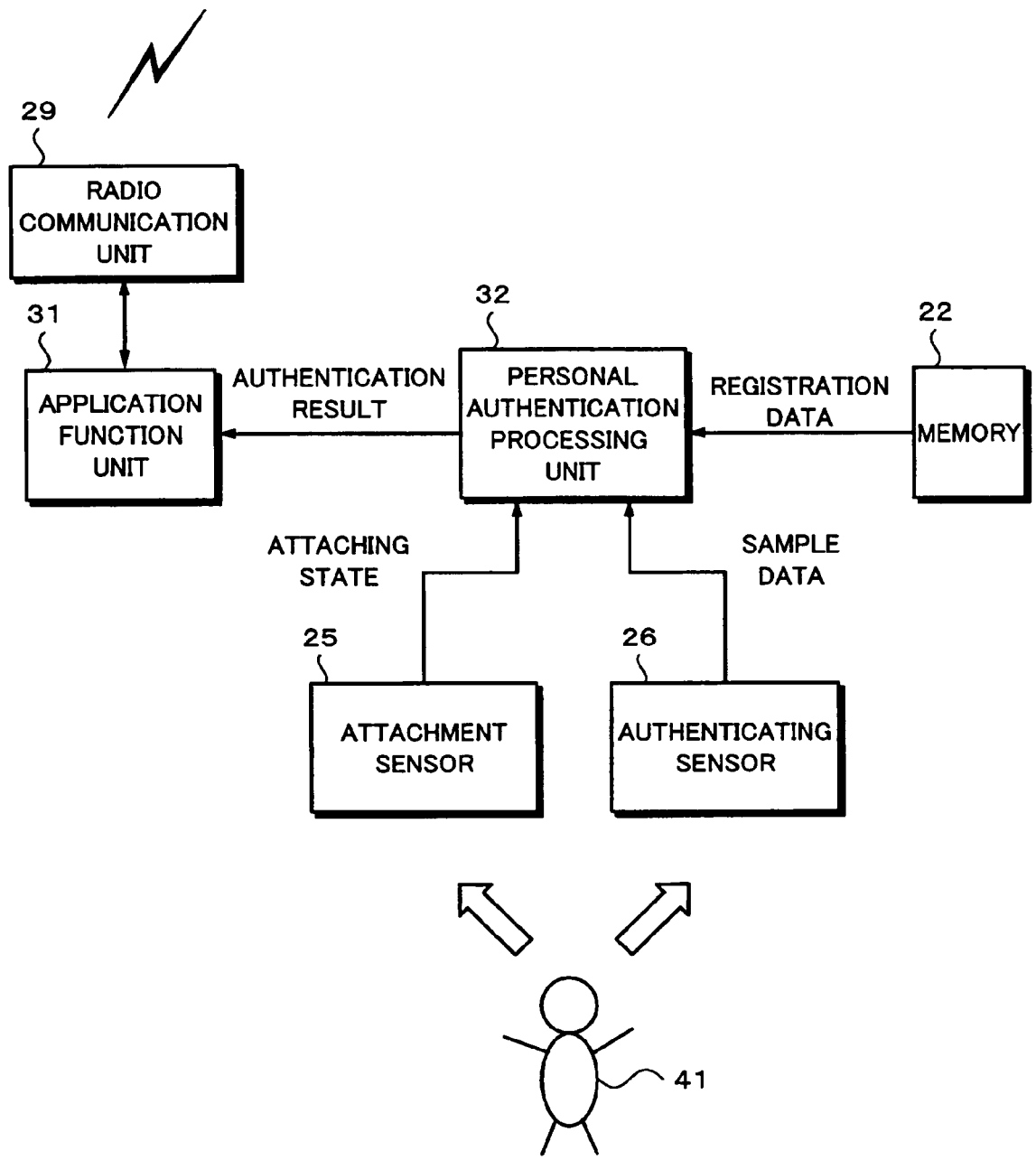
FIG. 5 is a schematic diagram for explaining functions and transmission/reception data of the electronic apparatus according to the embodiment of the invention.

The functions of the electronic apparatus 1 will now be described with reference to FIGS. 4 and 5. FIG. 4 is a block diagram showing a system construction of the electronic apparatus 1. The electronic apparatus 1 includes: a CPU (Central Processing Unit) 21; a memory 22; an input unit 23; an information display unit 24; an attachment sensor 25; an authenticating sensor 26; a power source unit 27; a camera unit 28; a radio communication unit 29; and an external storage 30. Each component element is made to correspond to each unit of the electronic apparatus 1 shown in FIGS. 2 and 3. The camera unit 4 corresponds to the camera unit 28, the display unit 5 corresponds to the information display unit 24, the fingerprint sensor 6 corresponds to the authenticating sensor 26, the electrostatic capacity sensor 7 corresponds to the input unit 23, and the attachment sensor 11 corresponds to the attachment sensor 25, respectively.

The biogenic information obtaining means corresponds to the camera unit 28 and the authenticating sensor 26. The authenticating means corresponds to a personal authentication processing unit 32. The control means corresponds to an application function unit 31. The attachment detecting means corresponds to the attachment sensor 25. Further, as will be explained hereinafter, biogenic information of the person with the use authority is stored into storing means in the electronic apparatus 1 (for example, the memory 22), storing means other than the electronic apparatus (for example, a database in a personal computer), or the like.

The CPU 21 controls the operation of each unit on the basis of a program loaded in the memory 22. In addition to the memory 22, the input unit 23, information display unit 24, attachment sensor 25, authenticating sensor 26, power source unit 27, and the like are connected to the CPU 21. A menu for controlling the electronic apparatus 1 is displayed onto the information display unit 24 and an image photographed by the camera unit 28 can be also displayed. The power source unit 27 comprises a battery, a stabilizing circuit, and the like for supplying a power source to each unit of the apparatus on the basis of a control signal from the CPU 21.

Further, the camera unit 28, radio communication unit 29, and external storage 30 are connected to the CPU 21. The radio communication unit 29 is an apparatus for executing short distance communication of a Bluetooth system, IrDA (Infrared Data Association) system, or the like, communication of a wireless LAN (Local Area Network), or public radio communication such as a PHS (Personal Handyphone System) or the like. Communication with another computer or communication with an outdoor access point can be executed by such a radio communication unit 29. The external storage 30 is, for example, a removable memory card.

Although the CPU 21 is programmed so as to execute each application process and personal authentication, portions corresponding to those functions are expressed here by the application function unit 31 and the personal authentication processing unit 32, respectively. The application function unit 31 is a function unit for realizing the functions of the electronic apparatus 1 and executes, for example, communication with the outside, image display to the display unit 5, or the like. The personal authentication processing unit 32 is a function unit for executing authentication of a user 41 from biogenic information of the user 41.

A relation between each function of the electronic apparatus 1 and transmission/reception data will now be described with reference to FIG. 5. First, the attachment sensor 25 detects whether or not the electronic apparatus 1 has been attached to the user 41 and transmits its attaching state as data to the personal authentication processing unit 32. The data showing the attaching state can be transmitted by allocating each state to a specific numerical value or code in such a manner that, for example, if the electronic apparatus 1 has been attached to the user, the attaching state is set to "1" and if it is not attached, the attaching state is set to "0".

The authenticating sensor 26 obtains the biogenic information of the user 41 and transmits it as sample data to the personal authentication processing unit 32. As mentioned above, various biogenic information such as fingerprint, iris, and the like are considered as biogenic information of the user 41. In accordance with the biogenic information which is used for the authentication, the sensor for obtaining such biogenic information is properly selected. For example, in the case of obtaining the fingerprint as biogenic information, video information or pattern information corresponding to the fingerprint becomes sample data.

When the personal authentication processing unit 32 receives the data from the attachment sensor 25 and the authenticating sensor 26, first, it discriminates whether the electronic apparatus 1 has been attached or not with reference to the data indicative of the attaching state and executes the personal authentication process only when it is put on. In the personal authentication, the registration data stored in the memory 22 is compared with the sample data sent from the authenticating sensor 26 and whether or not the user 41 is a person with the rightful authority is discriminated. A result of the authentication is transmitted to the application function unit 31. In this case as well, the authentication result is made to correspond to a specific numerical value or code in accordance with the contents of the authentication result. The registration data includes biogenic information of the person whom the authority for using a specific function of the electronic apparatus 1 has been given.

Means for registering the registration data which is used for the personal authentication can be prepared. The registration data is provided from, for example, the sensor of the electronic apparatus 1 regarding the obtainment of the biogenic information, an external database, or the like and stored into the memory 22.

When the authentication result shows that the user 41 is a person with the rightful authority, the application function unit 31 permits the execution of a predetermined related application. At this time, for example, if a user ID and a password are required or the like when an access service to an external network is received through the radio communication unit 29, since it has already been confirmed as mentioned above that the apparatus has been used by the rightful user, the valid user ID and password held in, for example, the memory 22 are previously provided for the access service.

By such a function of the electronic apparatus 1, the user 41 is authorized without executing the troublesome operation and can operate the electronic apparatus 1. Even when the user intends to receive such a service that it is required to input a user ID and a password after the authentication, the electronic apparatus 1 can automatically provide the user ID and password for the service on the assumption that the authority of the user 41 has already been confirmed. The inputting operation of the user 41 can be omitted.

Although the memory 22 previously records the registration data regarding the biogenic information as mentioned above, for example, it is also possible to construct in such a manner that in dependence on the storage capacity, the registration data is not held in the electronic apparatus 1 but a verifying process is executed on the basis of the biogenic information accumulated in the database or the like in the external personal computer. In this case, as shown in FIG. 5, the radio communication unit 29 is used for connection with the outside and the authentication result and the sample data are outputted from the authenticating sensor 26 through the personal authentication processing unit 32 and the application function unit 31. On the contrary, it is also possible to download the related registration data from the external database through the radio communication unit 29 and compare it with the sample data by the personal authentication processing unit 32.

Figure 6:
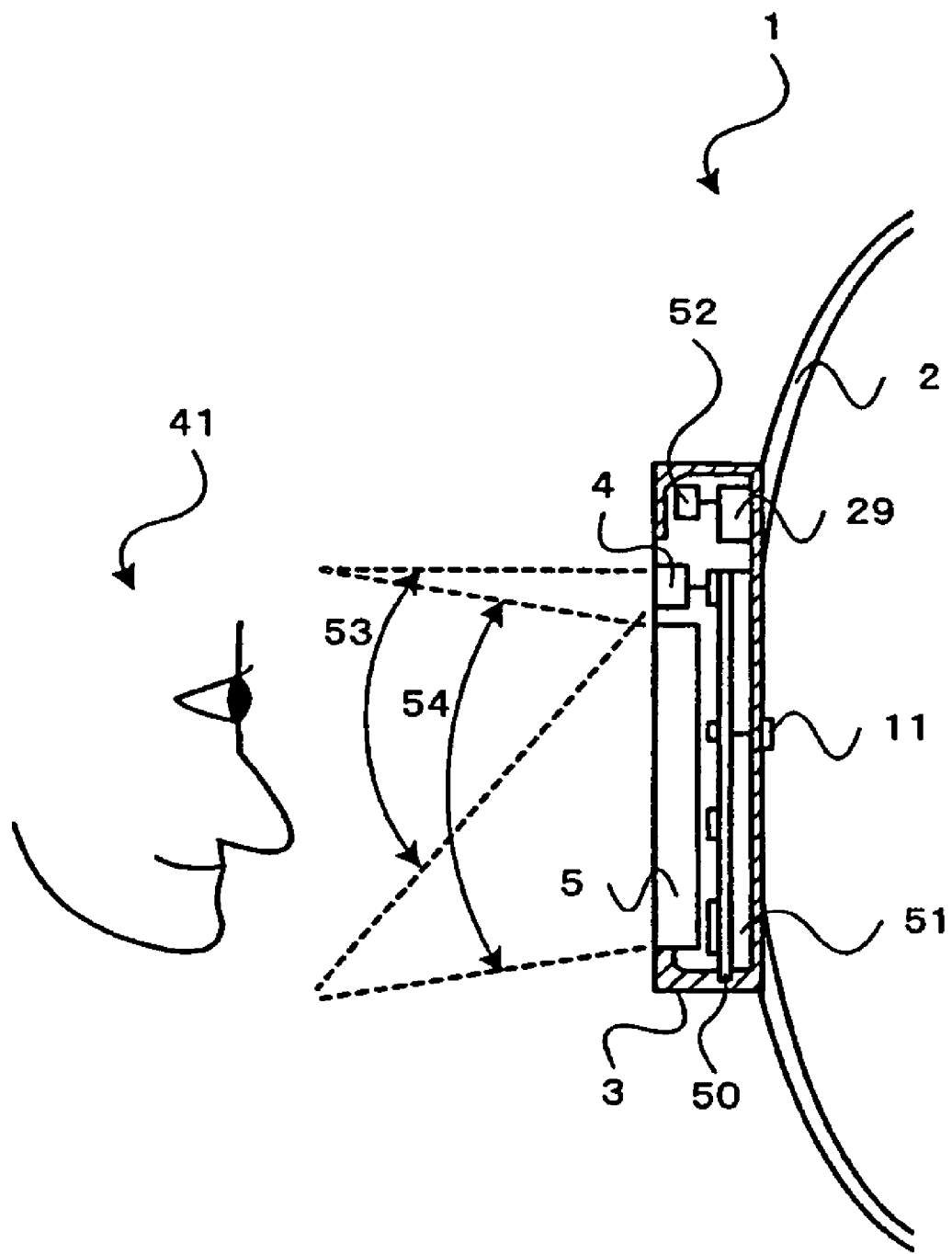
FIG. 6 is a cross sectional view of the electronic apparatus according to the embodiment of the invention and a schematic diagram showing the user who operates the electronic apparatus.

An internal construction of the electronic apparatus 1 will now be described with reference to FIG. 6. FIG. 6 is a cross sectional view of the electronic apparatus 1 and a schematic diagram showing the user 41 who operates it. As shown in FIGS. 2 and 3, the electronic apparatus 1 of FIG. 6 comprises the wristband 2, main body 3, camera unit 4, display unit 5, attachment sensor 11, and radio communication unit 29. The electronic apparatus 1 further includes a battery 51. The radio communication unit 29 is connected to an antenna 52. As mentioned above, a pressure sensor, an electrostatic sensor, a photosensor, an ultrasonic sensor, a temperature sensor, or the like can be used as an attachment sensor 11.

When the user 41 puts the electronic apparatus 1 on, the attachment sensor 11 detects a human body (wrist) of the user 41 and outputs a detection signal as an electric signal to an electronic circuit board 50. The electronic circuit board 50 discriminates the attaching state from the electric signal. If it is determined that the user 41 has put the electronic apparatus 1 on, the electronic circuit board 50 outputs, for example, a signal "1".

On the contrary, when the user 41 removes the electronic apparatus 1, since the attachment sensor 11 cannot detect the human body, the electronic circuit board 50 determines that the electronic apparatus 1 is not put on, and outputs, for example, a signal "0". At this stage, the result of the personal authentication stored in the memory or the like is also automatically reset.

The camera unit 4 is arranged near the display unit 5. For example, it is possible to design the camera unit 4 so that a viewing angle 53 of the camera unit 4 is sufficiently wider than a viewing angle 54 of the display unit 5. This is because when the user 41 looks at the display contents (as shown in FIG. 6) on the display unit 5 in the normal state, image data (outline, iris, and the like) of the face of the user 41 has to be certainly fetched. The fetched image data is transmitted as sample data for authentication to the connected electronic circuit board 50.

The radio communication unit 29 and the antenna 52 realize the external connecting function and a data exchanging process with the electronic apparatus 1 is executed by a control signal from the electronic circuit board 50 connected to them. If it is necessary to transmit the sample data and the authentication result when the external database and services are used, those data is outputted through the radio communication unit 29 and the antenna 52 in accordance with the control signal from the electronic circuit board 50.

Figure 7:
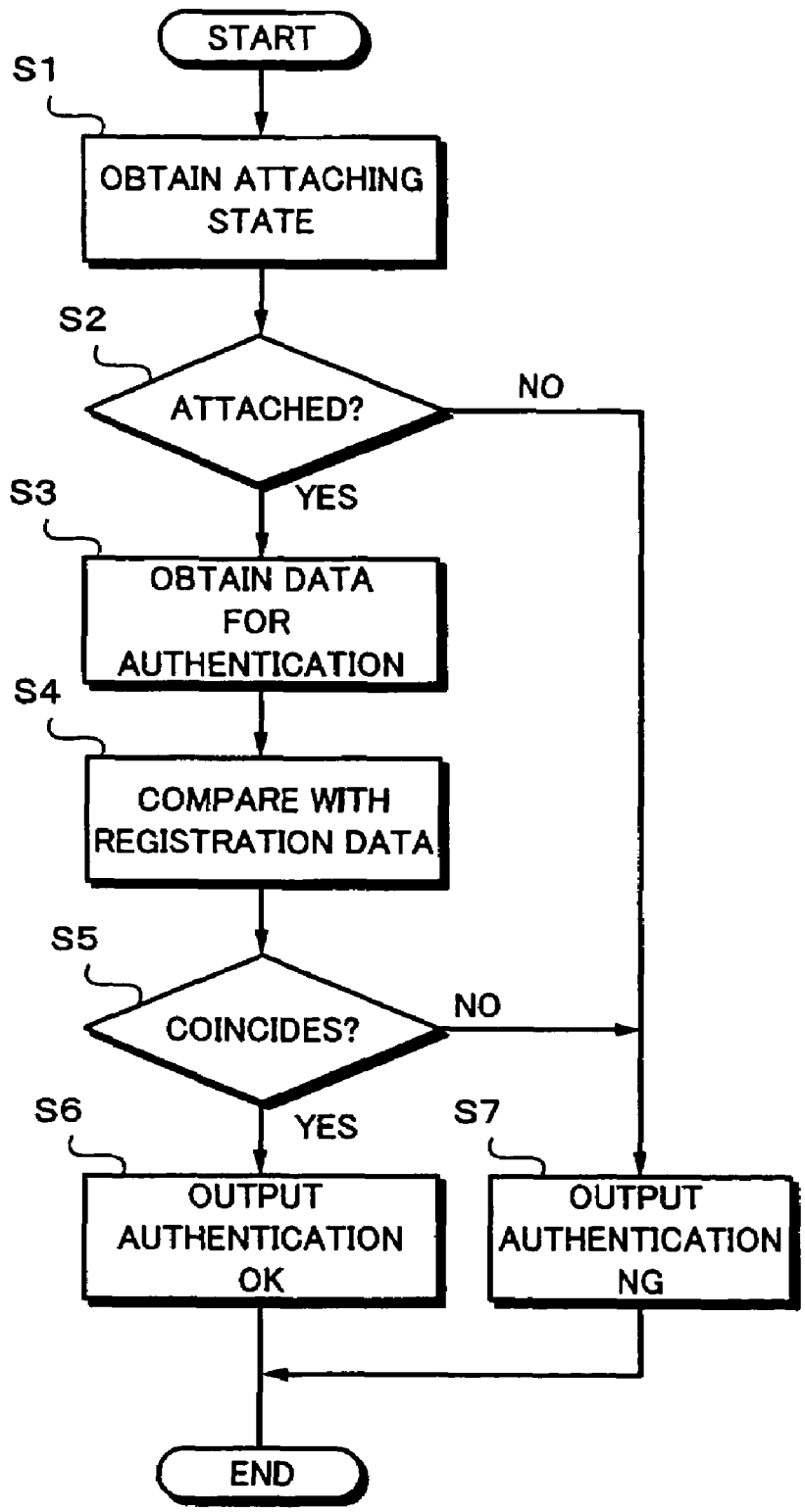
FIG. 7 is a flowchart showing a processing procedure of a personal authentication processing unit.

A process of the personal authentication processing unit 32 will now be described with reference to a flowchart of FIG. 7. This processing routine is ordinarily and repetitively executed at predetermined intervals. The personal authenticating process finally discriminates whether or not the user 41 is a person with the rightful authority and updates, for example, the authentication information stored in a predetermined area in the memory by data showing a discrimination result. When a power source of the electronic apparatus 1 is turned on, an initial process is executed and data (for example, "0") showing that the user 41 does not have the rightful authority is stored in the authentication information.

First, in step S1, data showing whether or not the electronic apparatus 1 has been put on the user 41 is obtained from the attachment sensor 25. For example, in the state where the electronic apparatus 1 has been put on the user 41, the attachment sensor 25 outputs a signal "1". In the state where it is not put on, the attachment sensor 25 outputs a signal "0".

In step S2, whether or not the electronic apparatus 1 has been attached is discriminated on the basis of the signal from the attachment sensor 25. In the case of the attaching state, step S3 follows and the sample data is obtained from the authenticating sensor 26. After that, in step S4, the sample data obtained from the authenticating sensor 26 is compared with the registration data obtained from the memory 22 or the external database. Whether or not those data coincides is discriminated in step S5. Such a coincidence discriminating method differs in dependence on the biogenic information as a comparison target. The well-known discriminating method is used here in accordance with the biogenic information. For example, in the case of the fingerprint data, ordinarily, the registration data is constructed as pattern data and the comparison with the sample data is performed by paying attention to a predetermined characteristic point. The coincidence is not limited only to the case of the data which coincides perfectly. For example, it is also possible to adjust a degree of coincidence in such a manner that with respect to the data which lies within a range of a predetermined threshold value or the data which is determined to be coincident at a predetermined probability, it is decided to be coincident.

If it is determined that the biogenic information obtained from the attachment sensor 25 coincides with the registration data, the processing routine advances to step S6. The symbol or code (for example, "1") showing that the user 41 is a person with the rightful authority is stored into the authentication information. If it is determined in step S5 that the data does not coincide, for example, "0" is stored into the authentication information.

If it is determined in step S2 that the electronic apparatus 1 is not put on, step S7 follows and the symbol or code (for example, "0") showing that the user 41 is a person without the rightful authority is stored into the authentication information.

Upon starting the process requested by the user 41 or the like, the application function unit 31 discriminates whether or not the user 41 is a rightful person with reference to the authentication information in the memory mentioned above. If he is the rightful person, the requested process is executed. If it is not admitted that the user 41 is the rightful person, the user 41 is notified of a message showing that the process is not executed by such a reason by a proper message or the like.

By such a processing procedure, at the stage when the electronic apparatus 1 is not put on the user, the electronic apparatus 1 does not accept any operation. Only when the user 41 wears it, the personal authentication is executed from the biogenic information of the user 41. If the user 41 is not a person with the rightful authority, the operation of the electronic apparatus 1 is not accepted yet. In the process shown in the flowchart of FIG. 7, when the electronic apparatus 1 has been put on, the personal authenticating process is certainly executed. However, the attachment is periodically discriminated at predetermined intervals and if the state where the same user 41 is wearing the electronic apparatus 1 can be confirmed, the personal authenticating process after the first time can be also omitted.

For example, in the case of the watch type electronic apparatus 1, usually, after the user put it on in the morning before he goes out, he is wearing the electronic apparatus 1 without removing it until he comes home. It is possible to construct the apparatus in such a manner that in consideration of such a situation, if the personal authentication is once executed after the electronic apparatus 1 was put on the body, the authentication result is continuously to be valid until he removes the electronic apparatus 1 as mentioned above.

However, when the user once removes the electronic apparatus 1, the personal authentication is newly executed on the basis of the biogenic information of the user who wears it. This is because after the electronic apparatus was once removed, it is not always put on the user having the rightful authority again.

If the electronic apparatus 1 is removed from the user 41 after he was admitted to be the rightful person, the authentication information in the memory is reset and the symbol (for example, "0") showing that the user 41 is the person without the rightful authority is recorded. Therefore, even if another person picks up the electronic apparatus 1, he cannot operate it as it is.

It is possible to control in such a manner that in the application function unit 31, if the user 41 is not admitted to be the rightful person, a specific operation is permitted in place of inhibiting all operations. For example, it is also possible to control in such a manner that even if the user 41 is not admitted to be the rightful person, he can operate a timer function and a camera function which the electronic apparatus 1 has, but the operation for referring to a scheduler which the electronic apparatus 1 has and the operation for a mail receiving/sending function are inhibited. Further, the operation and function which can be used can be also changed step by step in accordance with a degree of authentication regarding the user of the electronic apparatus 1, for example, a value of a probability at which it is determined on the basis of the biogenic information that the user 41 is the rightful person.

Further, it is also possible to control in such a manner that a plurality of users are registered as registration data which is used for personal authentication and applications which can be used are made different in accordance with the user who has put the electronic apparatus 1 on. Thus, the user of the electronic apparatus 1 can change the different operations and functions of the electronic apparatus 1 in accordance with the persons serving as authentication targets.

Although the watch type electronic apparatus has been mentioned as an example and described as an embodiment of the electronic apparatus 1 of the invention, the invention can be also applied to other wearable electronic apparatuses. If "use" by the user can be preferably discriminated other than the wearable electronic apparatuses, such a state is regarded as a concept in place of "attachment" described so far. For example, electronic apparatuses such as digital electronic camera, cellular phone, and the like can be considered as such apparatuses.

The feature of the invention can be also regarded as a feature in which one or a plurality of personal authenticating processes are executed without discriminating the presence or absence of the attachment by the user, and the execution of the application of electronic apparatus is controlled.

The present invention is not limited to the foregoing embodiment but many modifications and variations are possible within the spirit and scope of the appended claims of the invention.

What is claimed is:

1. An electronic apparatus configured to attach to a user, the electronic apparatus comprising:

attachment detecting means for detecting whether said electronic apparatus is attached to said user;

biogenic information obtaining means, separate from said attachment detecting means, for obtaining biogenic information regarding said user;

authenticating means for authenticating said user by comparing the biogenic information of said user obtained by said biogenic information obtaining means with biogenic information of a person with use authority of said electronic apparatus, and by determining whether said user is the person with said use authority, when said attachment detecting means detects that said electronic apparatus is attached to said user; and control means for permitting said user to use said electronic apparatus until said attachment detecting means detects that said electronic apparatus is not attached to said user, when said user is authenticated by said authenticating means, wherein the control means automatically provides login information to access a service of an external apparatus, when said user is determined to be permitted to use said electronic apparatus and the login information is required by the external apparatus, the login information including one or a combination of a user ID and password.

2. The apparatus according to claim 1, wherein at least two different biogenic information are used upon authentication of said user, and said authenticating means authenticates said user only when it is determined that said user is the person with said use authority with respect to all of the biogenic information or a predetermined number or more of the biogenic information in at least said two different biogenic information.

3. The apparatus according to claim 1, wherein said biogenic information obtaining means obtains the biogenic information of said user in a normal state when said user uses said electronic apparatus.

4. The apparatus according to claim 1, wherein said control means adjusts a range of permission of the use in accordance with a degree of the authentication of said user by said authenticating means or a person serving as an authentication target.

5. The apparatus according to claim 1, wherein the biogenic information of the person with said use authority is stored into storing means provided in said electronic apparatus or external storing means which can be accessed through a predetermined network.

6. The apparatus according to claim 1, wherein
said attachment detecting means detects whether said user wears said electronic apparatus,
and said control means permits said user to use said electronic apparatus under such conditions that it is detected by said attachment detecting means that said user wears said electronic apparatus and said user has been authenticated by said authenticating means.

7. The apparatus according to claim 6, wherein said attachment detecting means is a sensor for detecting that said user has come into contact with a main body of said electronic apparatus or enters a predetermined proximity state.

8. The apparatus according to claim 6, wherein
on the basis of authentication information which shows the presence or absence of the authentication of said user and which has been stored in a predetermined storing area by said authenticating means, said control means determines that said user has been authenticated, and
when a state where said user does not wear said electronic apparatus is obtained, said authenticating means updates said information to contents showing that said user is not authenticated.

9. An authenticating method for an electronic apparatus configured to attach to a user, comprising:
detecting, by an attachment sensor, whether said electronic apparatus is attached to said user;
obtaining, by a biogenic information sensor separate from the attachment sensor, biogenic information regarding said user;
authenticating said user by comparing the biogenic information of said user obtained in said obtaining with biogenic information of a person with use authority of said electronic apparatus, and by determining whether the user is the person with said use authority, when said detecting detects that said electronic apparatus is attached to said user;
permitting said user to use said electronic apparatus until said detecting detects that said electronic apparatus is not attached to said user, when said user is authenticated by said authenticating; and
providing, automatically, login information to access a service of an external apparatus, when said user is determined to be permitted to use said electronic apparatus and the login information is required by the external apparatus, the login information including one or a combination of a user ID and password.

10. The method according to claim 9, wherein
at least two different biogenic information are used upon authentication of said user, and
in said authenticating said user is authenticated only when it is determined that said user is the person with said use authority with respect to all of the biogenic information or a predetermined number or more of the biogenic information in at least said two different biogenic information.

11. The method according to claim 9, wherein in said obtaining, the biogenic information of said user is obtained in a normal state when said user uses said electronic apparatus.

12. The method according to claim 9, wherein in said permitting, a range of permission of the use is adjusted in accordance with a degree of the authentication of said user by said authenticating or a person serving as an authentication target.

13. The method according to claim 9, wherein the biogenic information of the person with said use authority is stored into storing means provided in said electronic apparatus or external storing means which can be accessed through a predetermined network.

14. The method according to claim 9, wherein the detecting comprises detecting whether said user wears said electronic apparatus,
and in said permitting, control is made so as to permit said user to use said electronic apparatus under such conditions that it is detected by said detecting that said user wears said electronic apparatus and said user has been authenticated by said authenticating.

15. The method according to claim 14, wherein in said detecting, a sensor is used for detecting that said user has come into contact with a main body of said electronic apparatus or enters a predetermined proximity state.

16. The method according to claim 14, wherein
in said permitting, on the basis of authentication information which shows the presence or absence of the authentication of said user and which has been stored in predetermined storing area by said authenticating, it is discriminated that said user has been authenticated, and
in said authenticating, when a state where said user does not wear said electronic apparatus is obtained, said information is updated to contents showing that said user is not authenticated.

17. An electronic apparatus configured to attach to a user, the electronic apparatus comprising:
an attachment sensor configured to detect whether said electronic apparatus is attached to said user;
a biogenic information sensor, separate from said attachment sensor, configured to obtain biogenic information regarding said user;
an authentication unit configured to authenticate said user by comparing the biogenic information of said user obtained by said biogenic information sensor with biogenic information of a person with use authority of said electronic apparatus, and by determining whether said user is the person with said use authority, when said attachment sensor detects that said electronic apparatus is attached to said user; and
a control unit configured to permit said user to use said electronic apparatus until said attachment sensor detects that said electronic apparatus is not attached to said user, when said user is authenticated by said authentication unit, wherein
the control unit is configured to automatically provide login information to access a service of an external apparatus, when said user is determined to be permitted to use said electronic apparatus and the login information is required by the external apparatus, the login information including one or a combination of a user ID and password.

18. The apparatus according to claim 1, wherein said authenticating means authenticates said user only when said electronic apparatus is first detected to be attached to said user by said attachment detecting means.

19. The method according to claim 9, wherein said authenticating comprises authenticating said user only when said electronic apparatus is first detected to be attached to said user in said detecting.

20. The apparatus according to claim 17, wherein said authentication unit is configured to authenticate said user only when said electronic apparatus is first detected to be attached to said user by said attachment sensor.

21. The apparatus according to claim 1, wherein the attachment detecting means detects whether said electronic apparatus is attached to said user independent of the biogenic information obtained by the biogenic information obtaining means.

22. The method according to claim 9, wherein the detecting comprises detecting whether said electronic apparatus is attached to said user independent of the biogenic information obtained in the obtaining step.

23. The apparatus according to claim 17, wherein the attachment sensor is configured to detect whether said electronic apparatus is attached to said user independent of the biogenic information obtained by the biogenic information sensor.

* * * * *